(12) United States Patent
Trimmer et al.

(10) Patent No.: US 8,974,656 B2
(45) Date of Patent: Mar. 10, 2015

(54) METHOD FOR ROUGHENING METAL SURFACES AND ARTICLE MANUFACTURED THEREBY

(75) Inventors: Andrew Lee Trimmer, Niskayuna, NY (US); Bin Wei, Mechanicville, NY (US); Joshua Leigh Miller, West Chester, OH (US); Nicholas Joseph Kray, Mason, OH (US); Michael Scott Lamphere, Hooksett, NH (US)

(73) Assignee: General Electric Company, Niskayuna, NY (US)

( * ) Notice: Subject to any disclaimer, the term of this patent is extended or adjusted under 35 U.S.C. 154(b) by 810 days.

(21) Appl. No.: 13/173,476

(22) Filed: Jun. 30, 2011

(65) Prior Publication Data

US 2011/0262771 A1    Oct. 27, 2011

Related U.S. Application Data

(63) Continuation-in-part of application No. 11/786,996, filed on Apr. 13, 2007, now abandoned.

(51) Int. Cl.
| | | |
|---|---|---|
| C25F 3/02 | (2006.01) |
| C25F 3/14 | (2006.01) |
| B23H 3/00 | (2006.01) |
| B23H 3/04 | (2006.01) |
| B23H 9/00 | (2006.01) |
| B23H 9/10 | (2006.01) |
| C22C 14/00 | (2006.01) |
| C22C 19/05 | (2006.01) |

(52) U.S. Cl.
CPC .. *B23H 3/00* (2013.01); *B23H 3/04* (2013.01); *B23H 9/008* (2013.01); *B23H 9/10* (2013.01); *C22C 14/00* (2013.01); *C22C 19/05* (2013.01); *C25F 3/02* (2013.01)
USPC ............................................ 205/659; 205/658

(58) Field of Classification Search
CPC ................................................. C25F 3/00–3/14
USPC ..................................................... 205/658, 659
See application file for complete search history.

(56) References Cited

U.S. PATENT DOCUMENTS

| | | | | |
|---|---|---|---|---|
| 4,217,190 A | * | 8/1980 | Neal et al. ...................... 205/652 |
| 4,686,017 A | * | 8/1987 | Young ............................ 205/234 |
| 5,328,573 A | * | 7/1994 | Kawasumi et al. ........... 205/650 |
| 5,667,666 A | | 9/1997 | Matsuura et al. |
| 5,705,082 A | | 1/1998 | Hinson |
| 5,853,561 A | * | 12/1998 | Banks ........................... 205/646 |
| 7,195,800 B2 | | 3/2007 | Sugano et al. |
| 2003/0141193 A1 | * | 7/2003 | Hossick-Schott ............. 205/104 |
| 2003/0143074 A1 | * | 7/2003 | Tsukamoto et al. ......... 416/96 R |
| 2005/0057004 A1 | * | 3/2005 | Yamazaki et al. ............ 277/592 |
| 2006/0061762 A1 | * | 3/2006 | Dwight et al. ................ 356/301 |
| 2008/0253922 A1 | * | 10/2008 | Trimmer et al. .............. 420/419 |

FOREIGN PATENT DOCUMENTS

GB          2069531 A    *    8/1981

\* cited by examiner

*Primary Examiner* — Nicholas A Smith
(74) *Attorney, Agent, or Firm* — Scott J. Asmus (57) ABSTRACT

A method for surface roughening a metal work piece includes disposing a region of the workpiece to be roughened proximate to a counter electrode. The region of the workpiece to be roughened and the counter electrode are subsequently disposed together in an electrolyte. An electric potential with current flow is applied between the work piece and the counter electrode to roughen the metal surface to a desired roughness.

22 Claims, 7 Drawing Sheets

METHOD FOR ROUGHENING METAL SURFACES AND ARTICLE MANUFACTURED THEREBY

The present application is a continuation in part of U.S. application Ser. No. 11/786,996, filed Apr. 13, 2007, the entire disclosure of which is incorporated herein by this reference.

BACKGROUND

The invention relates generally to a method of roughening metal surfaces and an article manufactured thereby, and more particularly to an electrolytic process for etching a metal surface.

Aerospace and other industries often require surface preparation of metals prior to adhesive bonding. A large number of components, such as turbine blades, fan, compressor blades and other composite parts are adhesively bonded to each other to achieve the fabrication of a completed unit. To ensure obtaining a good metal-to-metal or metal-to-nonmetal adhesive bond, the surface of the metal is required to be as clean as possible, but many metals have a surface that is too smooth or uniform to provide an optimum bond subsequent to cleaning. In one known approach to providing better adhesion, the metal surfaces are chemically treated to provide an etched surface thereby producing more surface area, which contributes to achieving the bond. In this approach, chemical treatment involves application of a sacrificial, porous bather layer (mask) and acid etchants to produce the desired roughening of metal surfaces. The etchant mixture may include combinations of nitric and hydrofluoric acids. The duration of the etching process is quite long and the etchant mixtures are difficult to handle. Moreover, etching has been limited in the degree of surface roughening which may be achieved.

Other roughening techniques have been used including mechanical means such as scratching or burr grinding. These techniques have drawbacks including distortion of the substrate, removal of excess material, inability or increased difficulty of roughening certain surfaces and inconsistent application. Moreover, with such techniques, it may be difficult to achieve increased levels of surface roughening desired for certain applications.

Accordingly, there is a need for an improved technique for roughening metal surfaces.

BRIEF DESCRIPTION

In accordance with one exemplary embodiment of the present invention, a method for surface roughening a metal work piece is provided. The method includes disposing a region of the work piece to be roughened proximate to a counter electrode. Subsequent to disposing the workpiece proximate to the counter electrode, the work piece and the counter electrode are together disposed in an electrolyte. An electric potential with current flow is applied between the work piece and the counter electrode to roughen the region of the work piece to a desired roughness.

In accordance with another exemplary embodiment of the present invention, a method for manufacturing a machined article is provided. The method includes disposing a region of a first work piece to be roughened proximate to a counter electrode. Subsequent to disposing the workpiece proximate to the counter electrode, the work piece and the counter electrode are, here again, together disposed in an electrolyte. An electric potential with current flow is applied between the work piece and the counter electrode to roughen region of the work piece to be roughened to a desired roughness. The work piece is removed from the electrolyte and washed using a washing medium. The work piece is then bonded to a nonmetallic substrate.

These and other features and improvements of the present application will become apparent to one of ordinary skill in the art upon review of the following detailed description when taken in conjunction with the several drawings and the appended claims.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a method for surface roughening a metal work piece in which a region of the work piece to be roughened is disposed or fixtured proximate to a counter electrode to form a fixtured assembly. Subsequent to disposing the region of the workpiece to be roughened proximate to the counter electrode, the region of the workpiece to be roughened and the counter electrode are disposed in an electrolyte bath. An electric potential is applied between the region of the workpiece to be roughened and the counter electrode to roughen a surface of the work piece to a desired roughness. In certain other embodiments of the present invention, the work piece is removed from an electrolyte and then washed using a washing medium. The work piece is then bonded to one or more metal or non-metal components to form a machined article, for example a composite laminate component. In certain other embodiments, a machined article is disclosed. The machined article includes a work piece having a roughened metal surface with desired roughness in the range of 90 to 400 microinches and one or more proximate components coupled to the roughened metal surface using a bonding material. Embodiments of the present invention eliminate the use of masks and acid etchants while producing roughened surfaces suitable for subsequent processing, such as adhesive bonding. Specific embodiments of the present invention are discussed below referring generally to FIGS. 1-6.

Figure 1:
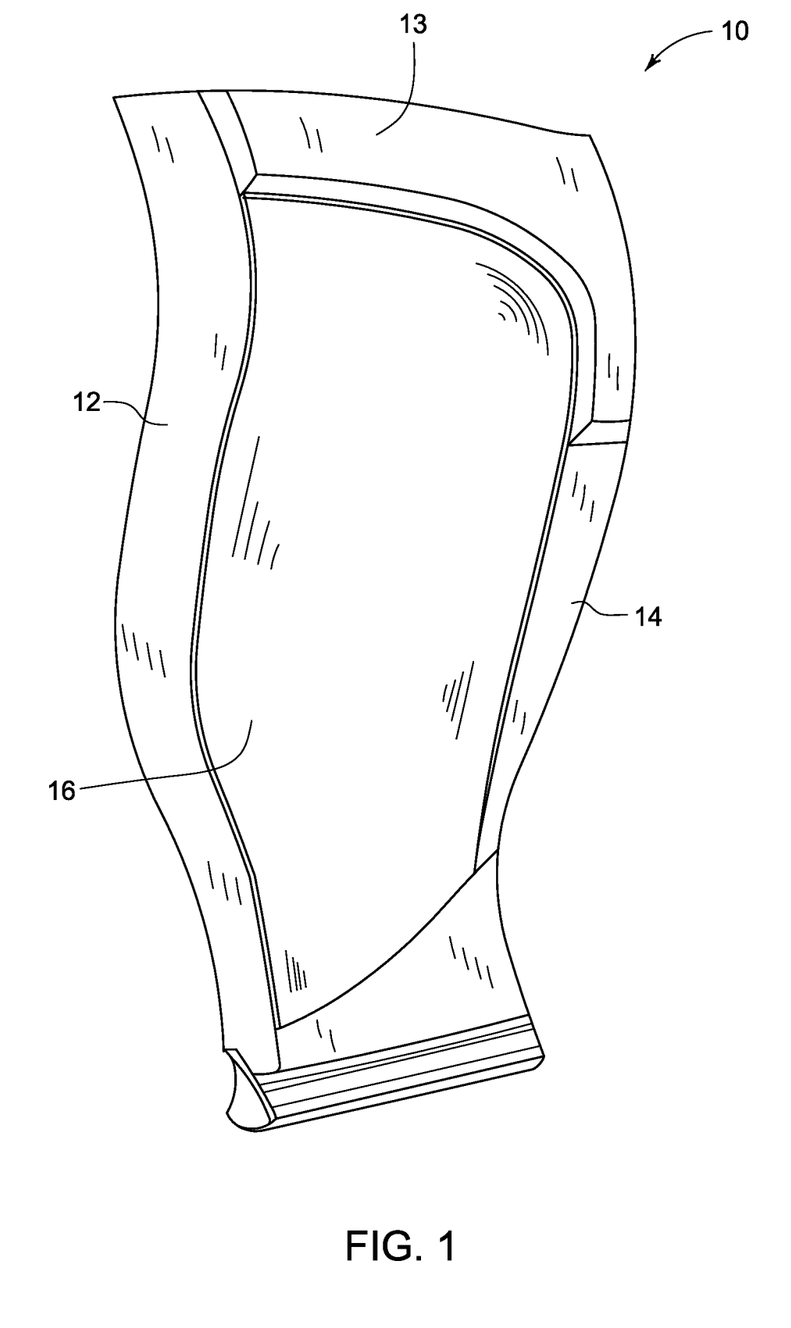
FIG. 1 is a diagrammatical representation of a plurality of metal work pieces roughened and joined to form a machined article such as a composite laminate component in accordance with an exemplary embodiment of the present invention.

Referring to FIG. 1, a machined article 10 is illustrated in accordance with an exemplary embodiment of the present invention. The machined article 10 includes a plurality of metal work pieces 12, 13, and 14 bonded to a composite substrate or support 16. In the particular embodiment shown, the article 10 is a fan blade, although the technique may be used with a wide range of manufactured articles such as turbine blade, compressor blade, or the like in which surface roughening is to be employed. Work piece 12 is a leading edge of the article, while work piece 13 is a cap, and work piece 14 is a trailing edge secured to the composite substrate 16. All of the work pieces are roughened so as to enhance bonding to the composite substrate 16. In the illustrated example, where any one of the work pieces is secured to an edge of the composite substrate 16, the substrate 16 may be provided with a recess to ensure the final profile desired. The method of roughening the edge surface of one of the work pieces 12 is described in greater detail below.

The present technique for surface roughening is described below with reference to one of the work pieces 12 of FIG. 1. The metallic material of the work piece 12 is broadly contemplated to be any metallic material requiring surface roughening for any purpose, including for the subsequent application of coatings, as well as for metal-to-metal, or metal-to-nonmetal adhesive bonding. The suitable metals of the work piece may include metal alloys and intermetallic fixtures. In certain embodiments, the metal work piece 12 includes one or more sheets such as titanium sheets, nickel sheets, or combinations thereof, such as for aircraft engine parts. In certain other exemplary embodiments, titanium may be alloyed with aluminum, vanadium, tin, chromium, molybdenum, and zirconium. In certain other exemplary embodiments, nickel may be alloyed with iron, chromium, aluminum, niobium, and molybednum. Due to their lightweight, high strength, and thermo stability, titanium and titanium alloys are useful for applications, such as aerospace applications as airframes and engine parts. In certain examples, titanium is used as a protective sheath for composite components, e.g. as a leading edge for a composite fan blade, wherein an internal surface of a leading edge is roughened prior to adhesive bonding to the composite fan blade components. It should be noted herein that the work piece 12 may include other metals known to those skilled in the art. The work piece 12 may include a trailing edge, a leading edge, or any other portions depending on the application. In certain other embodiments, the work piece 12 may include tip caps, fan blades, outlet guide vanes, stator blades, or a combination thereof. It should be noted herein again that the list is not exhaustive and may include other components, which require surface roughening applications.

Figure 2:
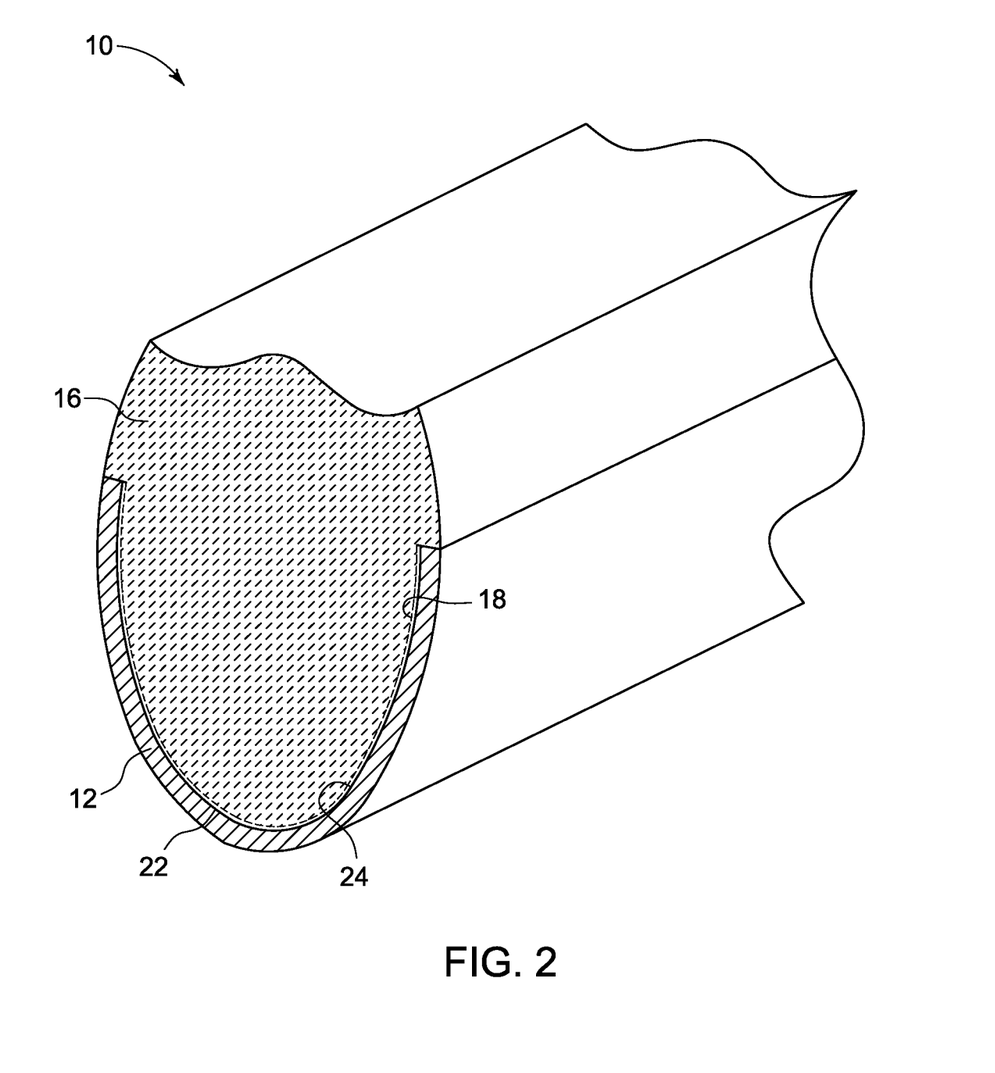
FIG. 2 is a diagrammatical representation of a machined article including a metal work piece fitted to a composite substrate in accordance with an exemplary embodiment of the present invention.

Referring to FIG. 2, the machined article 10 is illustrated in section in accordance with another exemplary embodiment of the present invention. In the illustrated embodiment, the article 10 includes the work piece 12 fitted into a recess 18 of the composite substrate 16. In the illustrated embodiment, to ensure a good adhesive bond, the work piece 12 has a leading edge 22 provided with a roughened internal surface indicated by the reference numeral 24. The roughness of the surface 24 may be in the range of 90 to 400 microinches. The roughening of the surface 24 is performed by electrolytic etching or roughening process and is explained in greater detail below with subsequent figures. The work piece 12 is bonded to the substrate 16 using a bonding medium, for example, epoxy adhesive film.

Figure 3:
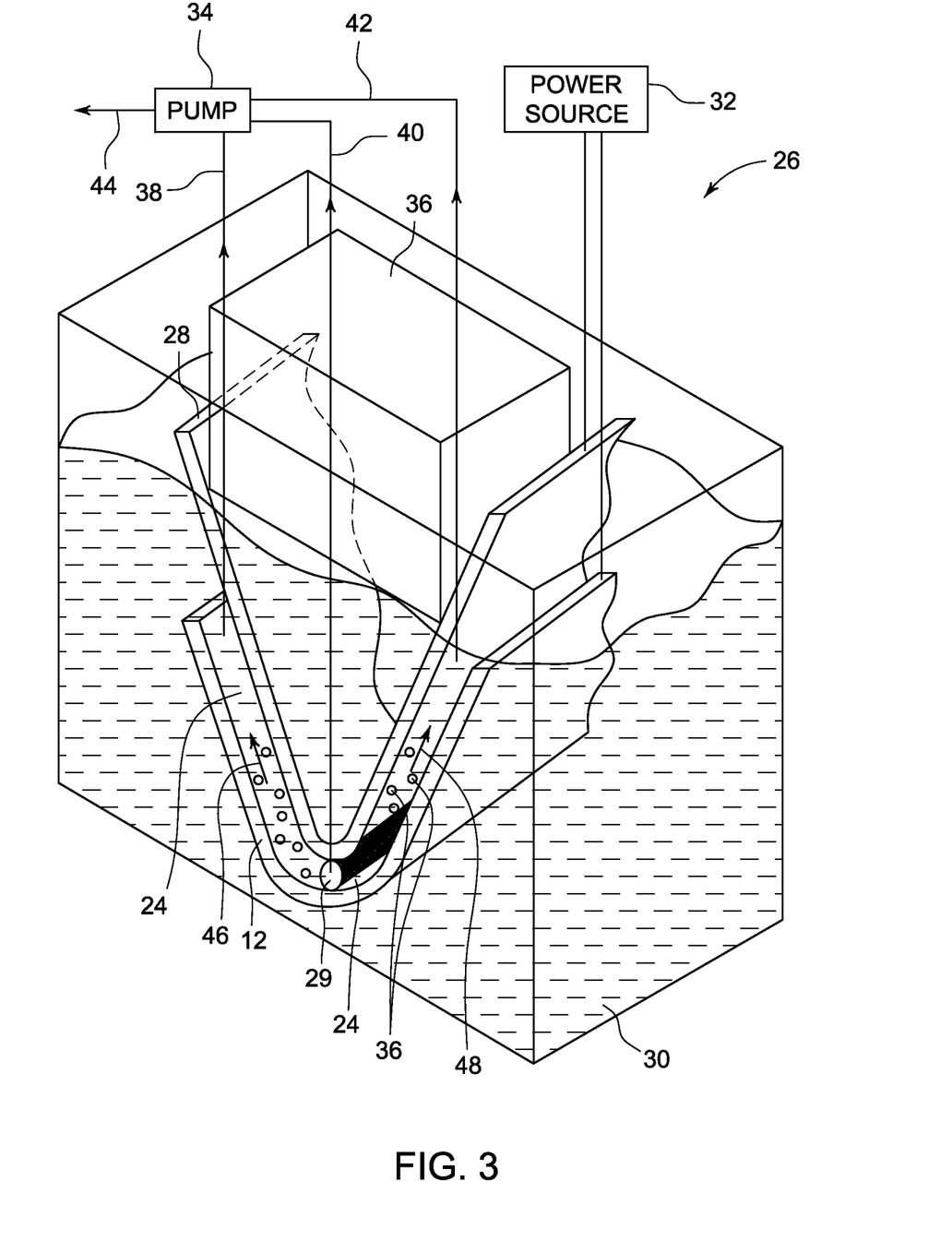
FIG. 3 is a diagrammatical representation of an exemplary device used for roughening a surface of a metal work piece in accordance with an exemplary embodiment of the present invention.

Referring to FIG. 3, illustrated is a device 26 used for roughening the surface 24 of the work piece 12 in accordance with yet another exemplary embodiment of the present invention. The device 26 includes a counter electrode 28 disposed or fixtured proximate to a region of the workpiece 12 to be roughened. In the illustrated embodiment, the counter electrode 28 includes a "mesh" like structure and may include stainless steel mesh, copper mesh, gold mesh, platinum mesh, titanium mesh, or a combination thereof. It should be noted herein that the list is not exhaustive and may include other materials known to those skilled in the art. In addition, it should be understood that the counter electrode 28 may be a solid structure. The region of the workpiece 12 to be roughened and the counter electrode 28 are initially disposed or fixtured relative to one another prior to being disposed together in an electrolyte bath 30. The electrolyte bath 30 may include an acid solution, base solution, salt solution, or a combination thereof. In certain exemplary embodiments, the electrolyte bath 30 may include a sodium bromide solution (for titanium or titanium alloys). At least one spacer 29 is provided between the region of the workpiece 12 to be roughened and the counter electrode 28 so as to separate the work piece 12 from the counter electrode 28 to prevent shorting of the circuit. In a preferred embodiment, the region of the work piece to be roughened is disposed proximate to the counter electrode and including a spacing of approximately in the range of 0.127-2.54 centimeters between the work piece and the counter electrode. In certain other exemplary embodiments, any other locating device may be used away from the machining zone to separate the region of the workpiece 12 to be roughened from the counter electrode 28. Additional spacers, or a network of spacers may be provided for this purpose, where appropriate.

Figure 4:
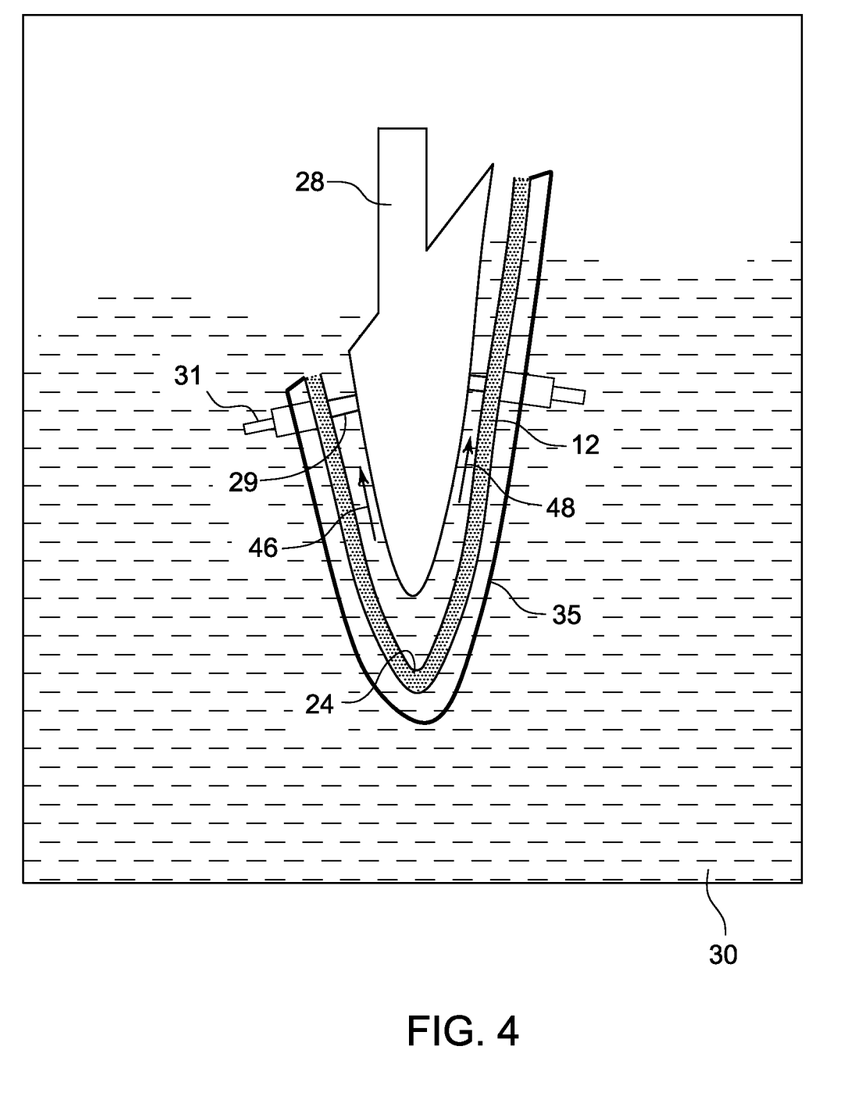
FIG. 4 is a schematic cross-section of an exemplary device used for roughening a surface of a metal work piece in accordance with an exemplary embodiment of the present invention.

Referring now to FIG. 4, illustrated is an alternate embodiment in which an alternate spacer configuration and inclusion of a means for protecting the exterior surface of the workpiece from stray electrical currents are disclosed. It should be understood that like elements have like numbers throughout the embodiment. In an alternate embodiment, a plurality of spacers 29 are positioned between the region of the workpiece 12 to be roughened and the counter electrode 28 during disposing, or fixturing, the workpiece 12 relative to the electrode 28 and prior to disposing the assembly in the electrolyte bath 30 so as to separate the region of the workpiece 12 to be roughened from the counter electrode 28 and prevent shorting of the circuit. It is disclosed that in this preferred embodiment, the electrode 28 may be configured as a conformal copper electrode. The spacers 29 are very small, and in one specific embodiment may be on the order of 0.635×0.3175×0.2286 centimeters. In this particular embodiment, the spacers 29 are comprised of TEFLON®, but alternatively may be formed of any non-conducting, chemically inert material. A plurality of electrical bus pads 31 are configured proximate the region of the workpiece 12 to be roughened to exert a force on at least a portion of the spacers 29, thereby achieving high pressure contact for the passage of an electrical current. In a preferred embodiment, the electrical bus pads 31 are configured to deliver at least a 50 lbs compression force to the spacers 29, thereby achieving high-pressure contact for passage of the electrical current. The electrical bus path is critical because an intermittent electrical contact will allow sparking to occur and may result in the work piece 12 becoming unusable. In the illustrated embodiment to protect the exterior surface of the workpiece 12 from such stray electrical currents, a compliant boot 35 may be included to enclose an exterior of the region of the work piece 12 to be roughened. More specifically, the compliant boot 35 is configured about an exterior sidewall of the region of the workpiece 12, but may be offset a distance therefrom. The compliant boot 35 eliminates stray current attack on the exterior of the work piece 12.

Figure 5A:
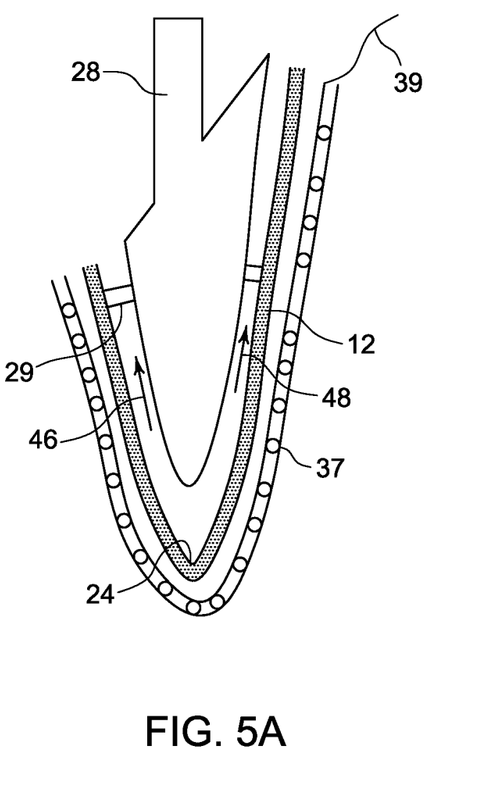
FIGS. 5A and 5B are partial cross-sections of an exemplary device used for roughening a surface of a metal work piece in accordance with an exemplary embodiment of the present invention.

Illustrated in FIGS. 5A and 5B are alternative means for protecting the workpiece 12 from stray electrical attacks. More particularly, as best illustrated in partial schematic cross-section in FIG. 5A, in lieu of the compliant boot 35, a bias anode 37 may be included to minimize stray electrical currents from reaching the work piece 12 to be roughened. The bias anode 37 may be configured as a mesh or solid structure, that is positioned proximate an exterior of the workpiece 12, and conforming thereto, but offset a distance therefrom. The bias anode 37 provides an additional electrical field via an electrical connection 39, and neutralizes unwanted surface potentials that would change the shape or quality of the exterior work piece surface. Similar to the compliant boot 35, the bias anode 37 minimizes the possibility of stray current attacks on the exterior of the work piece 12.

Figure 5B:
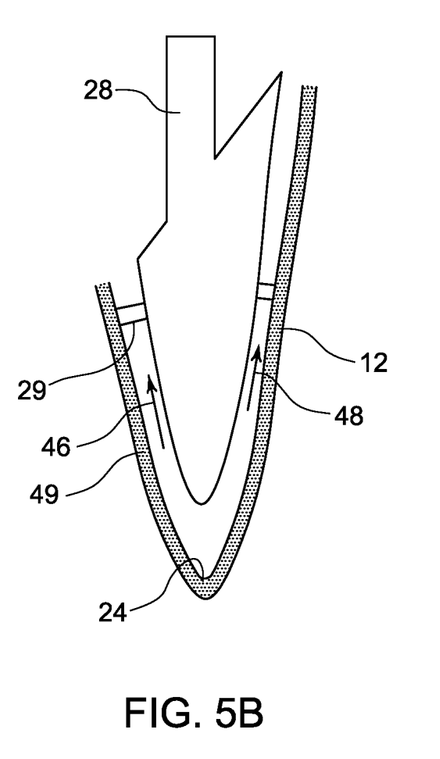

As best illustrated in partial schematic cross-section in FIG. 5B, in lieu of the compliant boot 35, a sacrificial shield 49 may be included to minimize stray electrical currents from reaching the exterior of work piece 12 to be roughened. The sacrificial shield 49 may be configured of a material such as zinc, in a mesh or solid structure, that is positioned proximate an exterior of the workpiece 12. More specifically, the sacrificial shield 49 is configured to conform to the shape of the work piece 12 and in contact therewith. Similar to the compliant boot 35, the sacrificial shield 49 minimizes the possibility of stray current attacks on the exterior of the work piece 12.

In the previously described embodiments, and as best illustrated in FIG. 3, the work piece 12 and the counter electrode 28 are coupled to a power source 32. The power source 32 is configured to apply an electric potential (for example, an electric potential in the range of 5 to 30 volts) between the work piece 12 and the counter electrode 28 to roughen the internal surface 24 of the work piece by electrolytic etching process. The electric potential may be applied for duration approximately in the range of 0.5 to 30 minutes. In certain embodiments, a pulsed electric potential is applied between the work piece 12 and the counter electrode 28. In one example, the electric power is applied for 0.1 seconds, and then switched off for 0.12 seconds. The pulsed application of the electric potential may be varied to cause desired roughening of the surface depending on the application. The voltage, the duration and the pulse regime (if the source is pulsed) may be varied, of course, to obtain the desired degree of roughening.

When the electric potential is applied between the work piece 12 and the counter electrode 28, current flows between the work piece 12 and the counter electrode 28 through the electrolyte bath 30. The positive and negative 'ions' in the electrolyte solution are separated and are attracted to the plates of the opposite polarity. The positive ions are attracted to the counter electrode (also referred to as the "cathode") and the negative ions are attracted to the work piece or positive plate (also referred to as the "anode") causing oxidation and thereby corrosion of the surface 24 of the work piece 12. As a result, the surface 24 of the work piece 12 is roughened.

In the illustrated embodiments, the device 26 may also include a pump 34 (FIG. 3) configured to force a flow of fluid (electrolyte) through the bath so as to remove gas bubbles 36 from the electrolyte 30 during application of electric potential between the work piece 12 and the counter electrode 28. The pump 34 is provided with the suction lines 38, 40, 42, and a discharge line 44. Arrows 46, 48, illustrates the flow of electrolyte. Alternatively, the pump 34 may be in fluidic communication with a flush pipe 48 (FIG. 4) having perforations formed therein and configured to force a flow of fluid (electrolyte), such as in a flushing motion, through the bath so as to remove gas bubbles 36 from the electrolyte 30 during application of electric potential between the work piece 12 and the counter electrode 28

Figure 6:
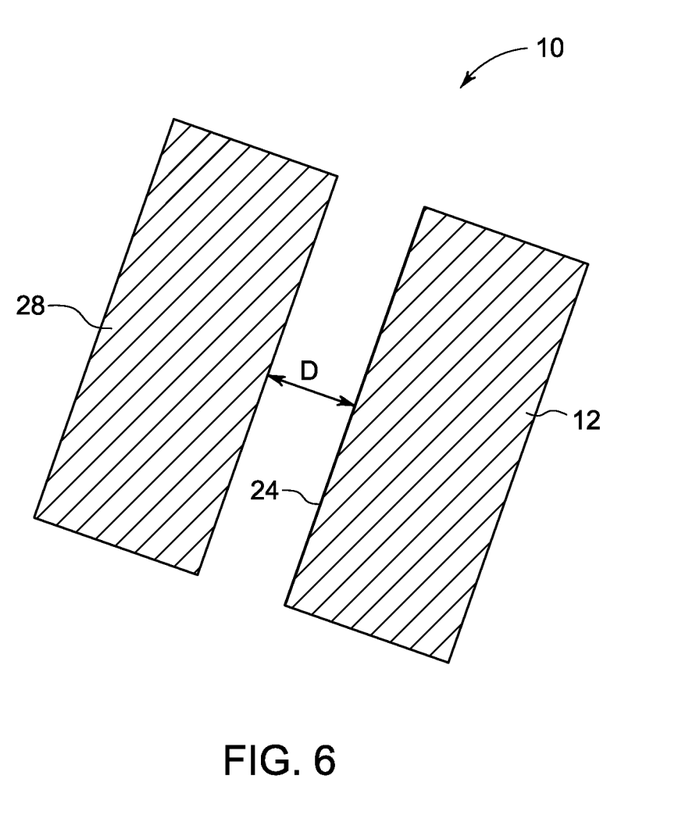
FIG. 6 is a diagrammatical representation of a metal work piece and a counter electrode in accordance with an exemplary embodiment of the present invention.

Referring to FIG. 6, a more detailed view of the work piece 12 and the counter electrode 28 is illustrated in accordance with an exemplary embodiment of the present invention. The work piece 12 has a leading edge provided with a surface 24 to be roughened. As discussed with reference to FIGS. 1 and 2, during the roughening process the work piece 12 is separated by a distance "D" from the counter electrode 28. Spacers (not illustrated in FIG. 5) are used to maintain distance "D" between the work piece 12 and the counter electrode 28 during the roughening process. The degree of roughness of the work piece 12 may be varied by altering the distance "D" between the work piece 12 and the counter electrode 28 during the roughening process for predetermined voltage and processing time. In certain exemplary embodiments, the distance "D" is approximately in the range of 0.05 to 1 inch. The counter electrode 28 is held in a desired position via a fixture 36 having a desired contour. Moreover, where different degrees of roughness are desired at different locations along the surface, this distance may be controlled to enhance localized roughening.

Figure 7:
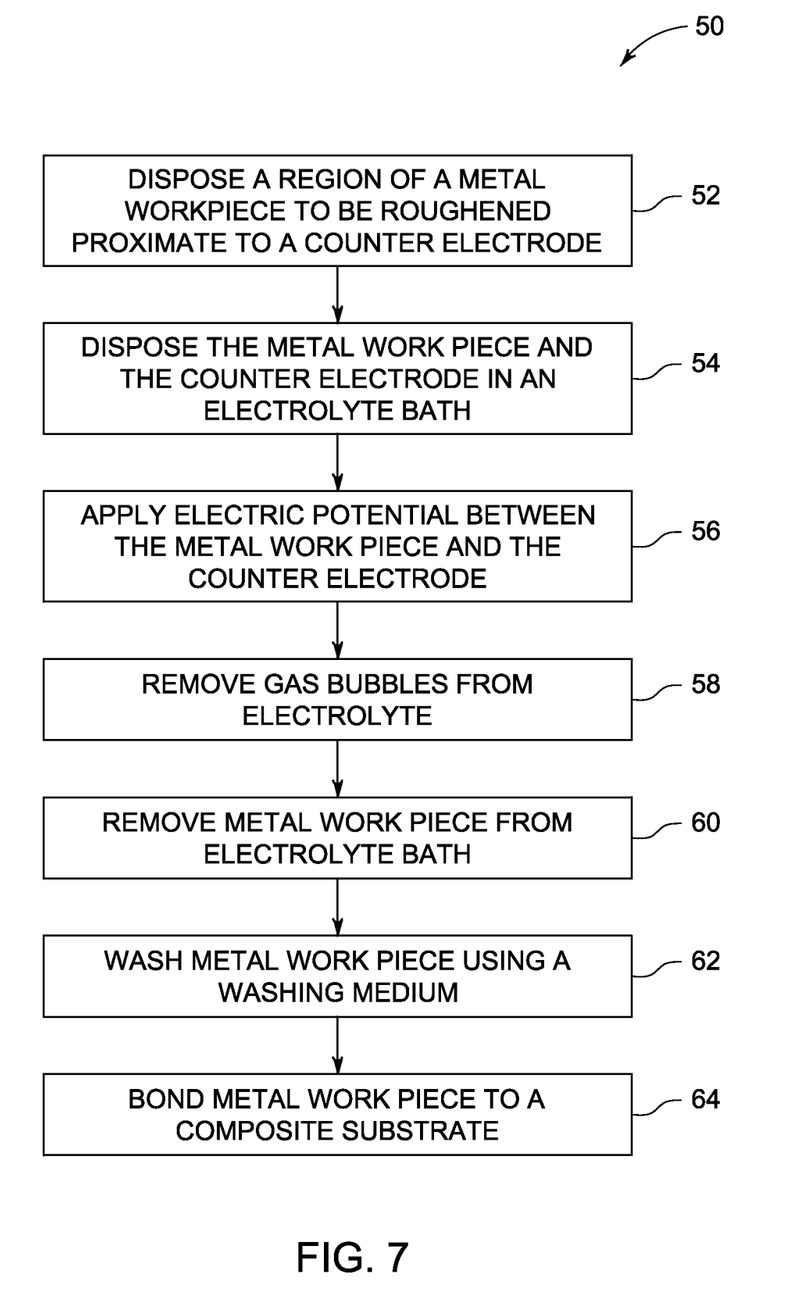
FIG. 7 is a flow chart illustrating exemplary steps involved in roughening a metal surface in accordance with an exemplary embodiment of the present invention.

Referring to FIG. 7, a flow chart illustrating exemplary steps involved in a method 50 of roughening a surface of a metal work piece is illustrated. The method includes initially disposing or fixturing a region of the work piece to be roughened proximate to a counter electrode as represented by the step 52 prior to disposing the assembly into an electrolyte bath. The region of the work piece to be roughened and the counter electrode are next disposed in an electrolyte bath as represented by the step 54. The region of the work piece to be roughened and the counter electrode are disposed in the electrolyte bath together as a fixtured assembly. The electrolyte bath may include an acid solution, base solution, salt solution, or a combination thereof. The work piece is located separated from the counter electrode by a distance "D" so as to prevent shorting of the circuit.

The method further includes applying an electric potential between the work piece and the counter electrode to roughen a desired surface of the work piece by electrolytic etching process as represented by the step 56. In certain embodiments, a pulsed electric potential is applied between the work piece and the counter electrode for a predetermined duration. The pulse parameters such as pulse duration, pulse interval, and pulse amplitude may be varied to cause desired roughening of the surface depending on the application.

In certain exemplary embodiments, the method may also include removing gas bubbles from the electrolyte during application of electric potential between the work piece and the counter electrode as represented by the step 58. The metal work piece is removed from the electrolyte bath after roughening process as represented by the step 60. The metal work piece with the roughened surface is washed using a washing medium as represented by the step 62. The material removed during the roughening process is cleaned using the washing medium. The metal work piece is then primed. The method includes bonding the work piece to a substrate, such as a composite laminate component as represented by the step 64. The work piece is bonded to the substrate using bonding material such as epoxy adhesive film.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for surface roughening a metal work piece, comprising:
   disposing a region of the work piece to be roughened proximate to a counter electrode;
   then disposing the region of the work piece and the counter electrode together in an electrolyte bath comprised of a sodium bromide solution; and
   applying a plurality of electric potential pulses with current flow between the work piece and the counter electrode to drive changes in surface roughness by altering pulse durations, pulse intervals and pulse amplitudes of the plurality of electric potential pulses, so as to roughen the region of the work piece to a desired roughness.

2. The method of claim 1, wherein the work piece comprises titanium alloyed with aluminum, vanadium, tin, chromium, molybdenum, and zirconium.

3. The method of claim 1, wherein the work piece comprises nickel alloyed with iron, chromium, aluminum, niobium, and molybdenum.

4. The method of claim 1, wherein the counter electrode comprises a stainless steel mesh, copper mesh, brass mesh, bronze mesh, gold mesh, platinum mesh, titanium mesh, or a combination thereof.

5. The method of claim 1, wherein the counter electrode comprises a solid structure.

6. The method of claim 5, wherein the counter electrode comprises a conformal copper electrode.

7. The method of claim 1, wherein disposing a region of the work piece to be roughened proximate to the counter electrode comprises disposing at least one spacer between the work piece to be roughened and the counter electrode.

8. The method of claim 7, further comprising positioning at least one electrical bus pad proximate each of the at least one spacer, wherein each of the at least one electrical bus pads is configured to exert a compression force on at least one spacer.

9. The method of claim 1, wherein disposing a region of the work piece to be roughened proximate to the counter electrode comprises providing a spacing approximately in the range of 0.127-2.54 centimeters between the work piece and the counter electrode.

10. The method of claim 1, comprising positioning a means for preventing stray current damage disposed proximate an exterior surface of the region of the work piece to be roughened.

11. The method of claim 10, wherein the means for preventing stray current damage is one of a compliant boot, a bias anode or a sacrificial shield.

12. The method of claim 1, comprising applying each of the plurality of electric potential pulses in the range of 5 to 30 volts between the work piece and the counter electrode.

13. The method of claim 12, further comprising applying each of the plurality of electric potential pulses for a time duration in the range of 0.5 to 25 minutes.

14. The method of claim 1, comprising roughening the surface of the work piece to a roughness in the range of 90 to 400 microinches.

15. The method of claim 1, further comprising removing gas bubbles from the electrolyte during application of the electric potential between the work piece and the counter electrode.

16. A method for manufacturing a machined article, comprising:
   disposing a region of a first work piece to be roughened proximate to a counter electrode;
   then disposing the region of the first work piece and the counter electrode together in an electrolyte bath comprised of a sodium bromide solution;
   applying a plurality of electric potential pulses with current flow between the first work piece and the counter electrode to drive changes in surface roughness by altering pulse durations, pulse intervals and pulse amplitudes of the plurality of electric potential pulses, so as to roughen the region of the first work piece to a desired roughness;
   removing the first work piece from the electrolyte bath;
   washing the first work piece using a washing medium; and
   bonding the first work piece to a to a composite substrate to form a composite laminate component.

17. The method of claim 16, wherein the first work piece comprises titanium alloyed with aluminum, vanadium, tin, chromium, molybdenum, and zirconium.

18. The method of claim 16, wherein the counter electrode comprises a stainless steel mesh, copper mesh, gold mesh, brass mesh, bronze mesh, platinum mesh, titanium mesh, or a combination thereof.

19. The method of claim 16, wherein the counter electrode comprises a copper conformal electrode.

20. The method of claim 16, comprising applying each of the plurality of electric potential pulses in the range of 5 to 30 volts between the first work piece and the counter electrode.

21. The method of claim 16, further comprising applying each of the plurality of electric potential pulses between the first work piece and the counter electrode for a time duration in the range of 0.5 to 25 minutes.

22. The method of claim 16, comprising roughening the surface of the first work piece to a roughness in the range of 90 to 400 microinches.

* * * * *